United States Patent Office 3,440,232
Patented Apr. 22, 1969

3,440,232
COPOLYMERS OF STYRENE COMPOUNDS
AND DIALKYLAMINO HYDROXYPROPYL
METHACRYLATES
Russell H. Cramm, Lake Jackson, and Russell T.
McFadden, Freeport, Tex., assignors to The Dow
Chemical Company, Midland, Mich., a corporation of Delaware
No Drawing. Filed Jan. 11, 1967, Ser. No. 608,493
Int. Cl. C08f 19/10
U.S. Cl. 260—80.73
12 Claims

ABSTRACT OF THE DISCLOSURE

The compositions are copolymers of a styrene compound and a 3-dialkylamino-2-hydroxypropyl methacrylate, useful as a light-stabilized styrene polymer. A specific composition is a copolymer of styrene and 3-dibutylamino-2-hydroxypropyl methacrylate.

---

This invention concerns novel thermoplastic polymer compositions and, more particularly, concerns copolymers of a 3-dialkylamino-2-hydroxypropyl methacrylate and a styrene compound having improved light stability.

Styrene polymers are generally noted as being unstable when exposed to the degrading effects of ultraviolet light, and many attempts have been made in the past to overcome this undesirable property. The usual approach to solve this problem has been the addition of ultraviolet light stabilizers. However, some of these stabilizers are volatile and cannot always be used effectively in stabilizing styrene polymer compositions.

It has now been discovered that a 3-dialkylamino-2-hydroxypropyl methacrylate can be polymerized with styrene to give a comonomerically light stabilized styrene polymer.

The copolymers of the present invention are conveniently prepared by reacting from about 2 to about 10, preferably from about 3 to about 7, weight percent of a 3 - dialkylamino - 2 - hydroxypropyl methacrylate wherein each alkyl group independently contains from 2 to 12, and preferably from 2 to 4, carbon atoms, from about 98 to about 80, preferably from about 97 to about 93, weight percent of a styrene compound, and from 0 to about 10 weight percent of a lower alkyl acrylate.

The copolymer can be prepared by polymerizing a mixture of a 3-dialkylamino-2-hydroxypropyl methacrylate and a styrene compound such as styrene, vinyltoluene, vinylxylene, mono- or dichlorostyrene, or mixtures of a major proportion by weight of at least one such styrene compound and a minor proportion of another ethylenically unsaturated copolymerizable compound, e.g. methyl methacrylate, vinyl acetate, or acrylonitrile, as well as a lower alkyl acrylate, in the desired proportions at temperatures between about 80° and 180° C., suitably in the presence of from about 0.5 to 2 percent of a free radical generating azo or diazo initiator such as azobisisobutyronitrile, azodicyclohexanecarbonitrile, as well as those described in U.S. Patent 2,471,959 and the like. The presence of an initiator in the polymerization reaction is for convenience only and, as such, is not required. The copolymer can also be prepared in admixture with a solvent or an organic liquid such as xylene, toluene, benzene, ethylbenzene, methyl ethyl ketone, acetone, carbon tetrachloride, and the like, or mixtures of said solvents.

The copolymers of the invention exhibit improved stability to ultraviolet light and are easily molded making them useful in molding, masting and coating. Various fillers and extenders such as glass, clay, sand and the like, can also be used with the present copolymers but are not required.

The following non-limiting examples serve to illustrate our invention.

EXAMPLE I

Preparation of the monomeric starting material 3-diethylamino-2-hydroxypropyl methacrylate.

Into a five-liter spherical glass reactor equipped for reflux, agitation, temperature control, and continuous reactant addition was placed 800 grams (11.0 moles) of diethylamine. The amine was stirred and heated until it refluxed, then the addition of 1420 grams (10.0 moles) of glycidyl methacrylate was begun at a rapid drop rate. As the ester was added the reflux temperature of the reactor rose until it reached 80° C., and was controlled at that point. All of the ester was added over a period of 3 hours, then the mixture was heated at 80° C. for 3 additional hours. While the mixture was still hot, it was subjected to a pressure of 50 mm. Hg to remove unreacted diethylamine. The crude product was stabilized by adding 50 grams of N,N-diphenyl-p-phenylenediamine, then transferred to a flash still.

The flash still was pumped to about 3 mm. Hg of pressure and the crude ester was heated. After a small forerun of unreacted glycidyl methacrylate and diethylamine was collected, the vapor temperature rose rapidly and the bulk of the monomer distilled as a colorless oil at 110–115° C. at about 0.1 mm. Hg of pressure. The distilled monomeric product had the following properties:

| | |
|---|---|
| Refractive index at 24° C. | 1.4585–1.4590 |
| Color | None |
| Amine equivalent weight __(theo. 215)__ | 213 |
| Boiling point _____° C. at 0.1 mm. Hg__ | 110–112 |
| Density at 24° C. ___gram per milliliter__ | 0.975 |

EXAMPLE II

Preparation of coatings with comonomerically light stabilized styrene polymers using different 3-dialkylamino-2-hydroxypropyl methacrylate derivatives, each prepared in a manner similar to Example I.

350 grams of toluene in each of four reaction flasks was heated for 30 minutes to reflux temperature of 110° C. with continuous nitrogen purging.

Monomer solutions were prepared from 127.5 grams of styrene, 15 grams of butyl acrylate and respectively, from 7.5 grams each of 3-diethylamino-2-hydroxypropyl methacrylate, 3-dipropylamino-2-hydroxypropyl methacrylate, 3-diisopropylamino-2-hydroxypropyl methacrylate, and 3-dibutylamino-2-hydroxypropyl methacrylate. The monomer solutions were purged with nitrogen for 30 minutes, after which 1.5 grams of azodicyclohexanecarbonitrile initiator was added to each solution.

Ten percent of each monomer solution was added fairly rapidly to one of the respective reaction flasks. After 10 minutes the monomer solutions respectively were added continuously over a 2 hours period.

One-half hour after the completion of the monomer addition, 0.3 gram of the initiator was added to each reaction flask; one-half hour later, another 0.3 gram of initiator was added. The reaction flasks were maintained at a temperature of 110° C. and the solutions digested for six hours.

The polymer product from each reaction flask was then coated on bleached sulfite paper in order to determine the light stability thereof.

In each case, the polymer showed improved stability to the effects of ultraviolet light as compared with a non-stabilized control prepared in a similar manner.

EXAMPLE III 700 grams of toluene was heated to 88° C. with nitrogen purging for 30 minutes in a round bottom, three-necked reaction flask equipped with a stirrer and condenser.

A solution of 2.25 grams of azobisisobutyronitrile dissolved in 285 grams of styrene and 15 grams of 3-dibutylamino-2-hydroxypropyl methacrylate, prepared in a manner similar to Example I, was purged with nitrogen for 30 minutes. The solution was then added dropwise to the toluene in the reactor over a one and one-half hour period while stirring and maintaining a temperature of 88° C. Three times at one-half hour intervals after completion of the monomer addition, one-third of the volume of a solution made by dissolving 0.75 gram of azobisisobutyronitrile in 13 grams of toluene was added to the reactor. The solution was digested at 88° C. for a total of four hours after the completion of this addition.

The polymer product had improved light stability compared with a styrene homopolymer prepared by the same procedure. The copolymer was free from yellowness after exposure to ultraviolet light for a period of 1000 hours.

In contrast, the styrene homopolymer discolored after only 130 hours.

Not only can styrene solution polymers of the comonomeric light stabilizer be prepared as described in the above example, but styrene-acrylic and -butadiene latexes, styrene molding powders, and other polymer systems containing styrene can also be prepared.

We claim:
1. A thermoplastic polymer composition, comprising a copolymer of from about 80 to about 98 weight percent of a styrene compound, from about 2 to about 10 weight percent of a 3-dialkylamino-2-hydroxypropyl methacrylate wherein each alkyl group independently contains from 2 to 12 carbon atoms, and from 0 to about 10 weight per unit of a lower alkyl acrylate.

2. The composition of claim 1, wherein the 3-dialkylamino-2-hydroxypropyl methacrylate is 3-diethylamino-2-hydroxypropyl methacrylate.

3. The composition of claim 1, wherein the 3-dialkylamino-2-hydroxypropyl methacrylate is 3-dipropylamino-2-hydroxypropyl methacrylate.

4. The composition of claim 1, wherein the 3-dialkylamino-2-hydroxypropyl methacrylate is 3-diisopropyl-2-hydroxypropyl methacrylate.

5. The composition of claim 1, wherein the 3-dialkylamino-2-hydroxypropyl methacrylate is 3-dibutylamino-2-hydroxypropyl methacrylate.

6. The composition of claim 1, wherein the styrene compound is styrene.

7. The composition of claim 1, wherein the copolymer contains from about 3 to about 7 weight percent of the 3-dialkylamino-2-hydroxypropyl methacrylate and correspondingly, from about 97 to about 93 weight percent of the styrene compound.

8. The composition of claim 1, wherein the copolymer contains about 85 weight percent styrene, about 5 weight percent of the 3-dialkylamino-2-hydroxypropyl methacrylate and about 10 weight percent of butyl acrylate.

9. The composition of claim 8, wherein the 3-dialkylamino-2-hydroxypropyl methacrylate is 3-diethylamino-2-hydroxypropyl methacrylate.

10. The composition of claim 8, wherein the 3-dialkylamino-2-hydroxypropyl methacrylate is 3-dipropylamino-2-hydroxypropyl methacrylate.

11. The composition of claim 8, wherein the 3-dialkylamino-2-hydroxypropyl methacrylate is 3-diisopropylamino-2-hydroxypropyl methacrylate.

12. The composition of claim 8, wherein the 3-dialkylamino-2-hydroxypropyl methacrylate is 3-dibutylamino-2-hydroxypropyl methacrylate.

References Cited

FOREIGN PATENTS 650,550   10/1962   Canada.

JOSEPH L. SCHOFER, *Primary Examiner.*

STANFORD M. LEVIN, *Assistant Examiner.*

U.S. Cl. X.R.

260—80.7, 86.7